United States Patent [19]
von Sturm

[11] 4,146,446
[45] Mar. 27, 1979

[54] METHOD FOR THE GENERATION OF HYDROGEN

[75] Inventor: Ferdinand von Sturm, Erlangen, Fed. Rep. of Germany

[73] Assignee: Siemens Aktiengesellschaft, Munich, Fed. Rep. of Germany

[21] Appl. No.: 839,784

[22] Filed: Oct. 6, 1977

[30] Foreign Application Priority Data

Nov. 2, 1976 [DE] Fed. Rep. of Germany ....... 2650217

[51] Int. Cl.² .......................... C25B 1/04; C25D 17/10
[52] U.S. Cl. ................................ 204/129; 204/290 R; 204/291; 204/292; 204/293
[58] Field of Search ............. 204/129, 290 R, 291–293

[56] References Cited
U.S. PATENT DOCUMENTS

3,479,276  11/1969  Jung et al. ....................... 204/290 R

FOREIGN PATENT DOCUMENTS

635934  2/1962  Canada ..................................... 204/129

OTHER PUBLICATIONS

"On the Electrolytic Separation of the Hydrogen Isotopes on a Pd Cathode" by A. Farkas, Trans. Faraday Soc., Apr. 1937, pp. 552–553.

*Primary Examiner*—R. L. Andrews
*Attorney, Agent, or Firm*—Kenyon & Kenyon, Reilly, Carr & Chapin

[57] ABSTRACT

Disclosed herein is a method for generating hydrogen through the electrolysis of water or aqueous solutions, wherein a cathode material is used which binds hydrogen to its surface in a potential range which is more positive than the reversible hydrogen potential, or which incorporates the hydrogen into its crystal lattice; subsequently, the bound hydrogen is liberated from the cathode material through supply of thermal energy.

13 Claims, 1 Drawing Figure

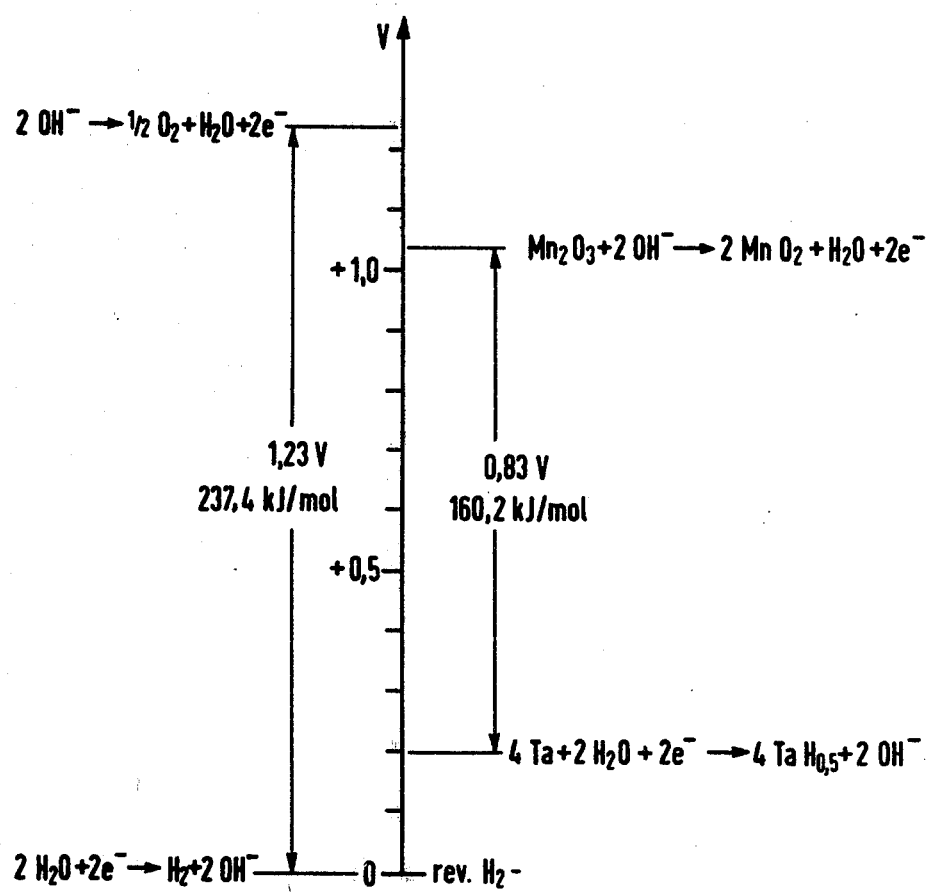

METHOD FOR THE GENERATION OF HYDROGEN

BACKGROUND OF THE INVENTION

The present invention relates to a method for generating hydrogen through electrolysis of water or aqueous solutions.

Hydrogen is of increasing importance as a basic material in the chemical industry, for example, hydrogen is utilized as a raw material in the production of plastics, and as an energy carrier of the future, as either a complete or partial replacement for electric power.

At present, hydrogen is primarily (about 78%) produced by petrochemical processes which are based on fossil fuels such as petroleum and coal as primary energy carriers. The generation of hydrogen from such energy carriers is, however, relatively expensive, and furthermore, the petroleum reserves, i.e., the availability of hydrocarbons, are limited. There have, accordingly, been numerous attempts to make the production of hydrogen independent of hydrocarbons.

In particular, the electrolysis of water, i.e., the dissociation of water through the supply of electric energy, suggests itself as a means for the production of hydrogen. Although presently considered as technically mature, this method, in which oxygen is formed in addition to hydrogen, needs improvement in its energy efficiency, which presently is only between about 45 to 65%.

In the electrolysis of water, it is a further disadvantage that the entire energy to be spent must be supplied in the form of valuable electric energy. Many proposals have, therefore, been made to split the overall reaction of water dissociation into individual steps in a manner such that a purely thermal cycle results (see, for example, British Patents Nos. 1,408,254 and 1,408,255, as well as U.S. Pat. Nos. 3,932,599 and 3,995,012). Such thermochemical cyclic processes, however, still present difficulties regarding the feasibility of the individual process steps, and in addition, they suffer from still unsolved problems of material separation and as yet unresolved material problems.

SUMMARY OF THE INVENTION

It is accordingly an object of this invention to reduce the amount of electric energy required in a method for generating hydrogen through the electrolysis of water or aqueous solutions, without having to tolerate the disadvantages connected with thermochemical processes.

According to the invention, this object is achieved by provision of a process comprising utilizing in the electrolysis of water or aqueous solutions a cathode material which binds hydrogen at the surface in a potential range which is more positive than the reversible hydrogen potential, or incorporates the hydrogen into the crystal lattice, and subsequently liberating the bound hydrogen from the cathode material by supplying thermal energy.

The method according to the invention for the generation of hydrogen through electrolysis of water or aqueous solutions is a combined electrochemical and thermal process. In this method, part of the electric energy otherwise required for the electrolysis is replaced by thermal energy, i.e., heat. This is achieved by reducing the thermodynamically calculated dissociation voltage of the water in the electrolysis by superposition on or coupling with, a chemical reaction which has a negative enthalpy of formation. For this purpose, a material is utilized as the cathode material, i.e., as the electrode material for the negative electrode at which the hydrogen is developed in the conventional electrolysis, which has the capability to bind, i.e., adsorb hydrogen at the surface in a potential range which is more positive than the reversible hydrogen potential (which range is also referred to in the description which follows as the "Undervoltage" range), or to incorporate the hydrogen into its lattice in said potential range. Subsequently, the bound hydrogen is split off from the cathode material in a second process stage, independent of the electrolytic cell, by supplying of thermal energy thereto; i.e., the electrode material is thermally regenerated. The cathode material freed of hydrogen in this manner is subsequently reemployed in the electrolysis and is returned into the electrolytic cell for this purpose.

The method according to the invention can, therefore, be grouped, in the case of the electrolysis of water, into the following process steps (wherein Me = a hydrogen-storing material):

1. Electrolytic dissociation:
Cathode reaction:

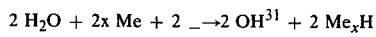

Anode reaction:

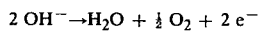

Overall reaction:

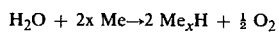

2. Thermal dissociation:

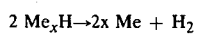

BRIEF DESCRIPTION OF THE DRAWING

The sole FIGURE is a graphical representation of the comparative voltage requirements for the process of this invention.

DETAILED DESCRIPTION OF THE INVENTION

In the method according to this invention, the savings of electric energy, which is first generated in a conventional power plant or by means of nuclear or solar energy with an efficiency of between 15 and 35%, theoretically corresponds to the free formation enthalpy of the reactions which proceed during the electrolysis simultaneously as coupled reactions. The second process step required in the method according to the invention, the thermal dissociation or decomposition, can generally be performed in the temperature range of up to about 900° C. This process step can, therefore, also be combined with a high-temperature reactor (HTR). The advantage of the method according to the invention is, therefore, seen particularly in the reduced use of valuable electric energy and in the separation of materials in the individual steps, which can be simply performed.

To increase the conductivity, it is advantageous in the method according to the invention to add, as is done in conventional water electrolysis, an alkali solution or acid to the water, preferably sodium hydroxide or sulfuric acid.

Besides water thus provided with additional materials, aqueous solutions of other substances may also be used in the method for generating hydrogen according to the invention, particularly solutions of hydrohalogenides or alkali halogenides. The electrolysis of a hydrochloric solution, i.e., of hydrochloric acid, for example, proceeds according to the following scheme:

$$2 HCl \rightarrow H_2 + Cl_2$$

hydrogen being developed at the cathode and chlorine at the anode. In the electrochemical decomposition of an aqueous sodium chloride solution, the so-called electrolysis of alkali metal chlorides or chlorine alkali electrolysis, the following reaction occurs:

$$2 H_2O + 2 NaCl \rightarrow H_2 + 2 NaOH + Cl_2.$$

These two reactions, therefore, can also serve for the production of chlorine, besides hydrogen; moreover, in the chlorine alkali electrolysis, sodium hydroxide is additionally produced in the form of soda lye.

In the electrolysis of such aqueous solutions, as in the electrolysis of water, there can be utilized, in accordance with the method of the invention, a cathode material which binds hydrogen in the undervoltage range, and the amount of electric energy required can be reduced.

In the method according to the invention, hydride-forming metals, preferably tantalum or palladium, and hydride-forming metal alloys, preferably of vanadium-niobium or nickel-titanium, can be used as cathode materials. In principle, however, all metals and alloys can be used which have a negative hydride formation enthalpy, i.e., which incorporate hydrogen into the lattice while giving off energy (exotheric reaction). Such substances are, for example: Mg, Ti, V, Nb, U, $Mg_2Ni$, TiFe, $LaNi_5$ and $PrCo_5$. However, a metal which adsorbs hydrogen at the surface while giving off energy may also be used as cathode material. Preferred among such metals are platinum or nickel, which is employed preferably in the form of Raney nickel.

In the system $LaNi_5/H_2$, for example, a desorption heat of 7.2 kcal/mol $H_2$ must be supplied in the dissociation of hydrogen. By about this amount, the free reaction enthalpy $\Delta G$ of the electrolytic water dissociation will then also be reduced, i.e., from 56.7 kcal/mol to about 50 kcal/mol. This means a gain in electric energy of about 12%. The gain in electric energy can be still higher, however, i.e., 30% and more, as will be shown in the discussion which follows.

In the water electrolysis according to the method of this invention, there may further be advantageously employed an anode material which forms an oxide in the corresponding undervoltage range, i.e., in a range which is more negative than the reversible oxygen potential. In this manner, the amount of electric energy required for the electrolysis can be reduced still further. The oxygen is subsequently split off thermally from the oxide obtained in the electrolysis. Metals, particularly silver or mercury, and metal oxides, particularly manganese (III) oxide $Mn_2O_3$, may preferably be utilized as anode materials.

Accordingly, anode materials may be used, for example, in the electrolysis of aqueous hydrogen halides or alkali halides solutions, which form halogenides in the undervoltage range; these halogenides are then decomposed thermally to give off halogen. The potential range in which the halogenide formation takes place must always be more negative than the reversible oxygen potential which is about +1.23 V, relative to the potential of the reversible hydrogen electrode. In addition, this potential range must also be more negative than the corresponding reversible halogen potential which, in the case of bromide, for example, is +1.07 V and in the case of chlorine, +1.36 V.

In the method according to the invention, electrode materials in power form are preferably employed. Such materials for the cathode and, optionally also for the anode, have the advantage that they have a large surface and therefore a high storage capacity for hydrogen and oxygen or halogen.

The invention is further illustrated with the aid of the following embodiment examples and FIGURE.

EXAMPLE 1 Cathode material: Ta Anode material: $Mn_2O_3$ or MnO (OH) Electrolyte: aqueous NaOH.

During the electrolytic process, hydrogen atoms are formed at the cathode by cathodic reduction and incorporated in the undervoltage range into the metal lattice of the tantalum. At the anode, manganese (IV) oxide i.e., $MnO_2$ is simultaneously generated at the same time from the manganese (III) oxide through anodic oxidation. The savings of energy in the reversible case over the customary water electrolysis can be taken from the figure. Thus, instead of the otherwise required amount of 1.23 V, the dissociation voltage of the water is only 0.83 V. This corresponds to a reduction of the amount of electric energy required from 237.4 kJ/mol $H_2O$ to 160.2 kJ/mol $H_2O$. In the decomposition of the tantalum hydride into tantalum and hydrogen and the decomposition of $MnO_2$ into $Mn_2O_3$ and $O_2$, the difference of 77.2 kJ/mol must then be supplied as thermal energy. This energy must be supplied in the case of tantalum hydride at about 400° C. and for $MnO_2$, at about 500° C. The theoretical savings of electric energy are 32.5%.

As a finite reaction rate is desired, higher dissociation voltages must be employed in the practical implementation of the method according to the invention, as is done in conventional electrolysis. In practice, the electrolysis operations are conducted with a voltage of about 2.0 to about 2.2 V and a current density of about 200 mA/cm². The reason for the large overvoltage is substantially the irreversibility of the oxygen electrode. However, in the method according to the invention, oxygen formation is circumvented and therefore the overvoltage is lower so that the energy savings are still more favorable than is found by the theoretical consideration.

In order to obtain high current densities in the electrolysis and to maintain the diffusion paths in the solid body small, it is advantageous to use electrode materials with large surfaces. The following possibilities, in particular, are available for this purpose:

(a) Plates pressed and/or sintered from powdered material, which can be removed from the electrolyte cell after the electrolytic process is completed and, after a washing and drying process, are fed to the thermal regeneration facility;

(b) materials in powder form which are placed in the respective electrode space and are made into a sludge with electrolytic liquid; in the electrolyte chamber, there is additionally provided a metallic conductor for applying the voltage, for example in the form of a sheet of metal in the case of a bipolar arrangement, and a grid plate or a diaphragm for defining the electrolyte chamber.

The use of electrode materials in powder form also has the advantage that the electrolysis can be performed continuously.

To be regenerated, the electrode material is taken from the cell, washed, dried and fed to the thermal decomposition. The following reactions take place with the above-mentioned electrode materials:

4 TaH$_{0.5}$ → 4 Ta + H$_2$;

2 MnO$_2$ → Mn$_2$O$_3$ + ½ O$_2$.

The thermal dissociation of the manganese dioxide (MnO$_2$) takes place at about 530° C. with a noticeable reaction; between about 850° and 940° C., Mn$_3$O$_4$ is formed, while more oxygen is being given off.

EXAMPLE 2

Cathode material: Pd; Anode material: Ag; Electrolyte: aqueus KOH.

Palladium stores hydrogen atoms in the lattice with an undervoltage of about 50 mV. The voltage remains constant until the conversion into the β-palladium hydride is complete. Silver is oxidized to Ag$_2$O at −56 mV, as measured against the reversible oxygen potential. Hydrogen can be split from the palladium hydride at about 200° C.; the equilibrium dissociation pressure is then 5 bar. Oxygen is given off from the Ag$_2$O above 350° C.

EXAMPLE 3

Cathode material: Ni; Anode material: Hg; Electrolyte: aqueous KOH.

If a nickel cathode is used, no hydride is formed during the electrolysis, but a superficial coating of the nickel with hydrogen atoms is obtained. In order to achieve a satisfactory charging capacity, a material with a large specific surface is used. Such a material is present, for example, in Raney nickel, as there is 1 H-atom to 5 Ni-atoms.

If platinum is utilized as the cathode material, one may also work with an acid solution. The build-up of the cathode hydrogen coating takes place here in the undervoltage range of 100 to 300 mV. The metallic mercury is oxidized to HgO at −303 mV relative to the reversible O$_2$ potential, and is then taken to the thermal decomposition facility.

EXAMPLE 4

Cathode material: VNb Anode material: Mn$_2$O$_3$ Electrolyte: aqueous KOH.

The procedure is as in Example 1. During the electrolysis, the hydride VNbH$_3$ is formed at the cathode from which hydrogen is separated at 100° C. at a pressure of 10 bar.

EXAMPLE 5

Cathode material: Ni-Ti alloy Anode material: Hg Electrolyte: aqueous KOH.

Particularly NiTi$_2$ is used as cathode material. In the electrolysis, the hydrogen is incorporated into the lattice.

What is claimed is:

1. In a method for generating hydrogen through the electrolysis of water or aqueous solutions, the improvement comprising utilizing as the cathode a material which either binds hydrogen at the surface thereof in a potential range which is more positive than the reversible hydrogen potential or incorporates hydrogen into its lattice and thereafter liberating the bound hydrogen from said material by the application of thermal energy thereto, said cathode material being selected from the group consisting of tantalum, vanadium-niobium alloy, nickel-titanium alloy, platinum, nickel, Mg, Ti, V, Nb, U, Mg$_2$Ni, TiFe, LaNi$_5$ and PrCo$_5$.

2. In a method for generating hydrogen through the electrolysis of water or aqueous solutions, the improvement comprising utilizing as the cathode a material which either binds hydrogen at the surface thereof in a potential range which is more positive than the reversible hydrogen potential or incorporates hydrogen into its lattice, said material being selected from the group consisting of tantalum, vanadium-niobium alloy, nickel-titanium alloy and platinum, and thereafter liberating the bound hydrogen from said material by the application of thermal energy thereto.

3. The method of claim 2 wherein said material is tantalum.

4. The method of claim 2 wherein said material is platinum.

5. In a method for generating hydrogen through the electrolysis of water or aqueous solutions, the improvement comprising utilizing as the cathode a material which either binds hydrogen at the surface thereof in a potential range which is more positive than the reversible hydrogen potential or incorporates hydrogen into its lattice, said material selected from the group consisting of vanadium-niobium alloy and nickel-titanium alloy, and thereafter liberating the bound hydrogen from said material by the application of thermal energy thereto.

6. The method according to claim 2 further comprising utilizing as the anode a material which forms an oxide in a potential range which is more negative than the reversible oxygen potential and thereafter liberating oxygen from the oxide by application of thermal energy thereto.

7. The method according to claim 6 further comprising utilizing as the anode a material which forms an oxide in a potential range which is more negative than the reversible oxygen potential and thereafter liberating oxygen from the oxide by application of thermal energy thereto.

8. The method according to claim 7 wherein said anode material is selected from the group consisting of metals and metal oxides.

9. The method according to claim 8 wherein said metal anode material is selected from the group consisting of silver and mercury.

10. The method according to claim 8 wherein said metal oxide anode material is manganese (III) oxide.

11. The method according to claim 7 wherein said cathode and anode materials are in powder form.

12. In a method for generating hydrogen through the electrolysis of water or aqueous solutions, the improvement comprising:
    (a) utilizing as the cathode a material which either binds hydrogen at the surface thereof in a potential range which is more positive than the reversible hydrogen potential or incorporates hydrogen into its lattice and thereafter liberating the bound hydrogen from said material by the application of thermal energy thereto; and
    (b) utilizing as the anode manganese (III) oxide to form an oxide in a potential range which is more negative than the reversible oxygen potential and thereafter liberating oxygen from the oxide by application of thermal energy thereto.

13. In a method for generating hydrogen through the electrolysis of water or aqueous solutions, the improvement comprising:
(a) utilizing as the cathode a material which either binds hydrogen at the surface thereof in a potential range which is more positive than the reversible hydrogen potential or incorporates hydrogen into its lattice and thereafter liberating the bound hydrogen from said material by the application of thermal energy thereto; and
(b) utilizing as the anode mercury to form an oxide in a potential range which is more negative than the reversible oxygen potential and thereafter liberating oxygen from the oxide by application of thermal energy thereto.

* * * * *